United States Patent [19]
Garnett et al.

[11] Patent Number: 5,660,511
[45] Date of Patent: Aug. 26, 1997

[54] END MILL WITH CORRECTION FOR SIDE DEFLECTION

[75] Inventors: Donald W. Garnett, Grand Ledge; John A. Watson, East Lansing, both of Mich.

[73] Assignee: The Olofsson Corporation, Lansing, Mich.

[21] Appl. No.: 443,011

[22] Filed: May 17, 1995

[51] Int. Cl.⁶ .............................. B23Q 15/14; B23C 9/00
[52] U.S. Cl. ............................................. 409/195; 409/190
[58] Field of Search ..................................... 409/190, 191, 409/193, 194, 80, 134, 195; 408/6, 11, 73

[56] References Cited

U.S. PATENT DOCUMENTS

| | | | |
|---|---|---|---|
| 2,340,210 | 1/1944 | Armitage et al. | 409/191 |
| 2,823,591 | 2/1958 | Craddock et al. | 409/190 |
| 3,602,090 | 8/1971 | Whetham | 409/239 |
| 3,628,002 | 12/1971 | Meese et al. | 409/122 |
| 3,641,849 | 2/1972 | Kinney | 409/80 |
| 3,818,334 | 6/1974 | Rosenberg | 408/11 X |
| 4,684,300 | 8/1987 | Break | 409/204 X |
| 4,703,415 | 10/1987 | Kishi et al. | 409/80 |
| 4,808,048 | 2/1989 | Miller | 409/239 |

*Primary Examiner*—William R. Briggs
*Attorney, Agent, or Firm*—Barnes, Kisselle, Raisch, Choate, Whittemore & Hulbert, P.C.

[57] ABSTRACT

An end mill for simultaneously milling two intersecting perpendicular surfaces of a part. The end mill is subjected to side cutting loads causing side deflection of the end mill, with the result that both the side-milled surface and the end-milled surface are not cut true to the part. To compensate for end mill deflection, a cam arrangement is provided to adjust the position of the end mill.

18 Claims, 5 Drawing Sheets

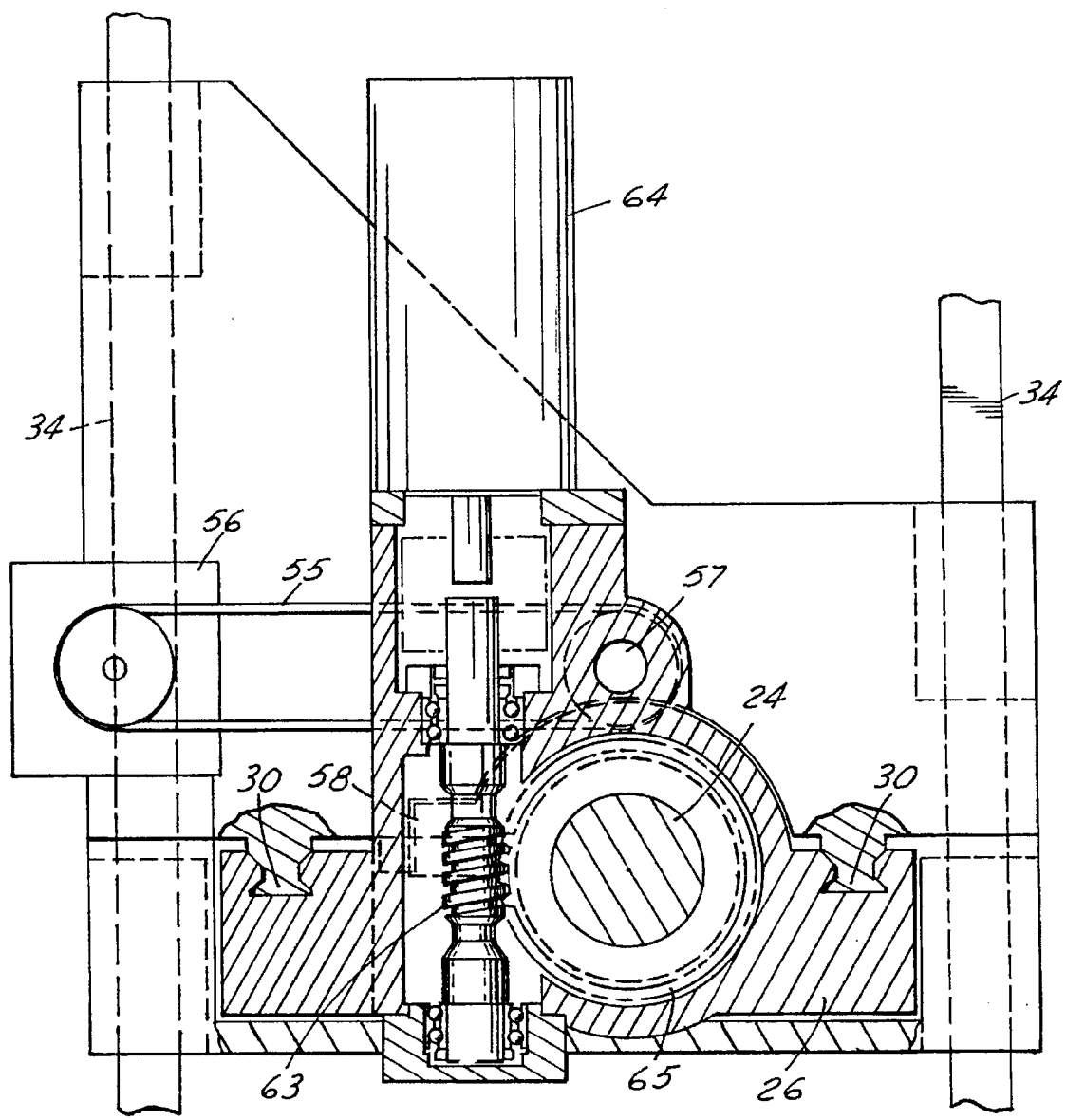
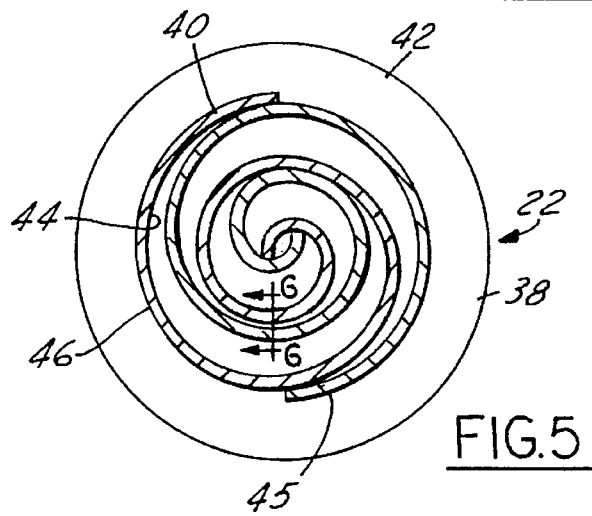
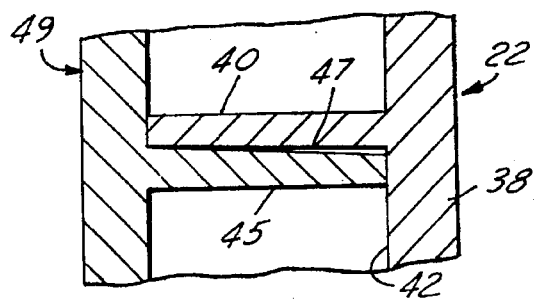

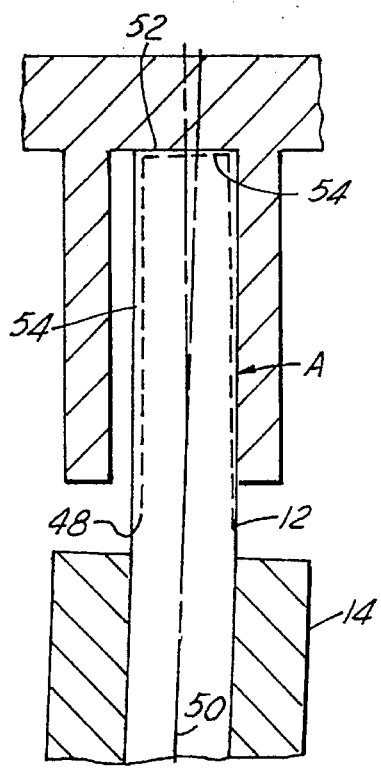
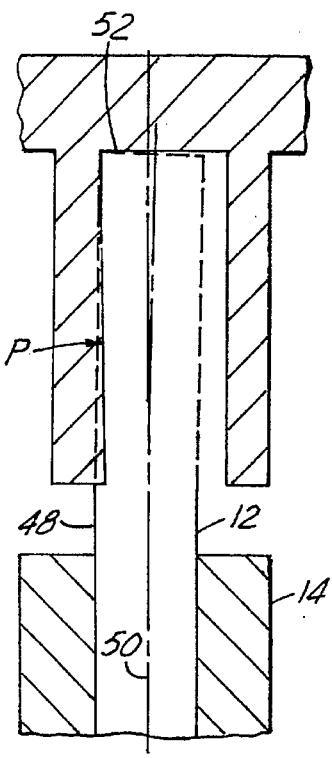
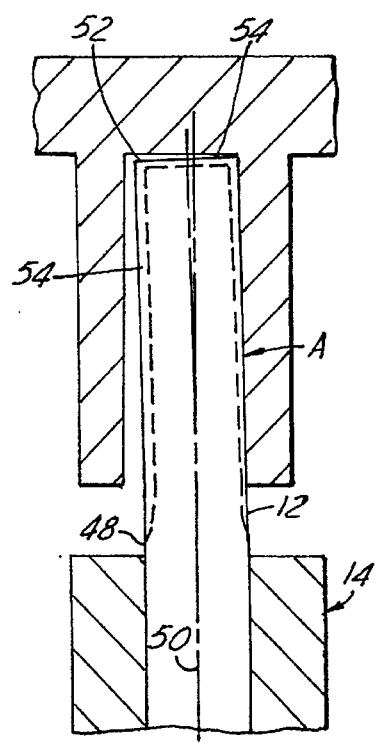
FIG.14  FIG.13  FIG.12
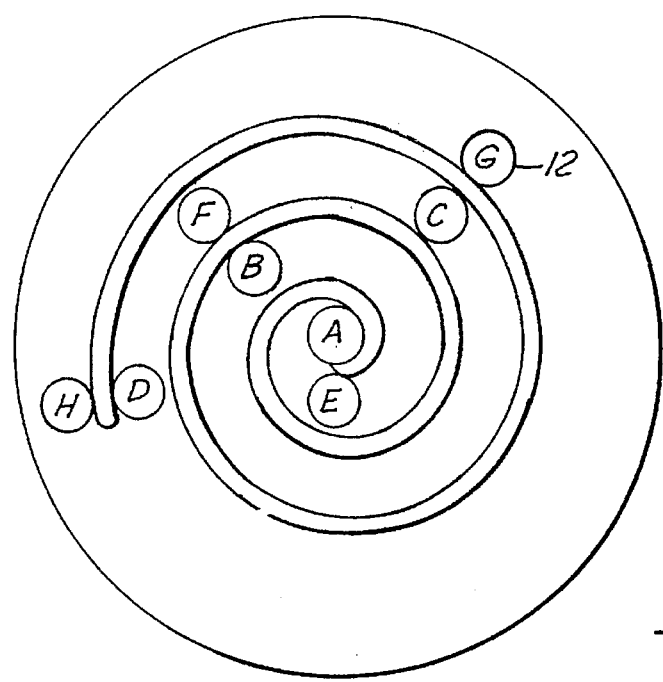
FIG.9

END MILL WITH CORRECTION FOR SIDE DEFLECTION

FIELD OF THE INVENTION

This invention relates generally to milling machines and refers more particularly to a milling machine having an end mill with means for compensating for side deflection due to side cutting loads.

BACKGROUND AND SUMMARY

Milling machines can be programmed so their spindle and mill holding collet move in a desired path. However, milling machines which employ end mills are subjected to side cutting loads which result in cantilever or side deflection of the end mill away from the cutting surface, with the tip of the mill deflecting more than the shank. As a result, both the side-milled surface and the end-milled surface are not true to the part and deviate from the prescribed path.

In critical applications, such as the milling of scroll parts for scroll gas compressors, in which the vertical walls and bottom surfaces of the scroll parts form the sealed gas pockets, any error in the machining of the parts prevents precise seal contact. The resulting gas leak from a pocket of high pressure to a pocket of lower pressure causes loss of compressor efficiency.

Several factors affect the slant of the walls, among which are:

(1) End mill characteristics including tool grind, tool dullness, modules of elasticity of tool material, mill flute depth, mill diameter and amount of extension of the mill beyond the mill collet;

(2) Rigidity of the mill collet;

(3) Mill spindle characteristics including shaft size, bearing size, bearing distance behind the end mill and the bearing preload;

(4) Depth of cut, feed rate, spindle RPM and material hardness;

(5) The number of flutes cutting at one time. In the middle of the scroll, multiple flutes may be cutting simultaneously due to the part wall wrapping around the end mill. At the outer extremity of the scroll wall, only one flute may be cutting at a time due to the reduced wrap of part around the end mill;

(6) The rigidity of the wall, which in the middle of the scroll, is relatively stiff due to the small curvature of the wall, but which at the scroll outer extremity is much more compliant due to the wall approaching flatness and the lack of support at the end of the wall; and (7) Inner wall milling versus outer wall milling in which the wall wrap around the end mill is greatly reduced and the forces causing slant are reversed from inward slant to outward slant.

Attempts have been made to correct the wall slant by reverse taper grinding the cylindrical portion of the end mill flutes. The nature of the factors mentioned above renders it impractical if not impossible to predict the exact amount of reverse taper required to make the correction. Also, since the slant effect varies as the mill cut progresses from the inner circle to the outward extremity of the scroll, the end mill taper grind requirements vary during the cut. Also, taper grinding does nothing to correct bottom end mill cut.

To best establish the necessary slant corrections, and in accordance with the present invention, a sample part can be milled under real world or actual working conditions in which all of the above error factors are in effect. Then the part is inspected for slant at various increments throughout the milling of the inside and outside scroll wall. The inspection results are loaded into the tool offset tables of a computer numerical control (CNC) at the matching intervals of the CNC program.

This invention provides the means and the mechanism to utilize the above inspection information to correctly cut subsequent parts, with slant corrections changing throughout the milling cut program.

Preferably, the mill spindle is mounted in a cage for pivotal movement to correct its position as necessary. The cage is tilted by a tilt servomotor as controlled by the CNC program, with position monitored by an encoder. When additional parts are machined, the tilt servomotor continuously corrects the angular position of the mill to compensate for the varying end mill deflection found in the sample cut part.

Preferably, the pivotal mounting for the mill spindle cage is provided by a pair of flexure trunnions mounted on opposite sides of the centerline of the end mill and spindle. Since the end mill receives cantilevered support from a holding collet and the bending of the end mill is concentrated a short distance beyond the collet face, the pivotal mounting should be located at a level near the face of the collet.

One object of this invention is to provide means for compensating for side deflection of an end mill having the foregoing characteristics and capabilities.

Another object is to provide side deflection compensation apparatus for an end mill which is constructed of a relatively few simple parts, is rugged and durable in use, and is relatively inexpensive to manufacture, assemble and operate.

These and other objects, features and advantages of the invention will become more apparent as the following description proceeds, especially when considered with the accompanying drawings.

BRIEF DESCRIPTION OF THE DRAWINGS

FIG. 2 is a sectional view taken on the line 2—2 in FIG. 1.

FIG. 5 is an elevational view with parts in section of the fixed and orbiting scroll parts of a scroll gas compressor.

FIG. 6 is a fragmentary sectional view taken on the line 6—6 in FIG. 5.

FIG. 9 is a semi-diagrammatic elevational view of a scroll with letter designations of positions at which actual slant measurements were made.

FIG. 12 is a fragmentary sectional view taken at position A showing the mill and side wall deflection when milling without compensation.

FIG. 13 is similar to FIG. 12 taken at position D, again milling without compensation.

FIG. 14 is similar to FIG. 12 taken at position A, but milling with compensation.

DETAILED DESCRIPTION

Figure 1:
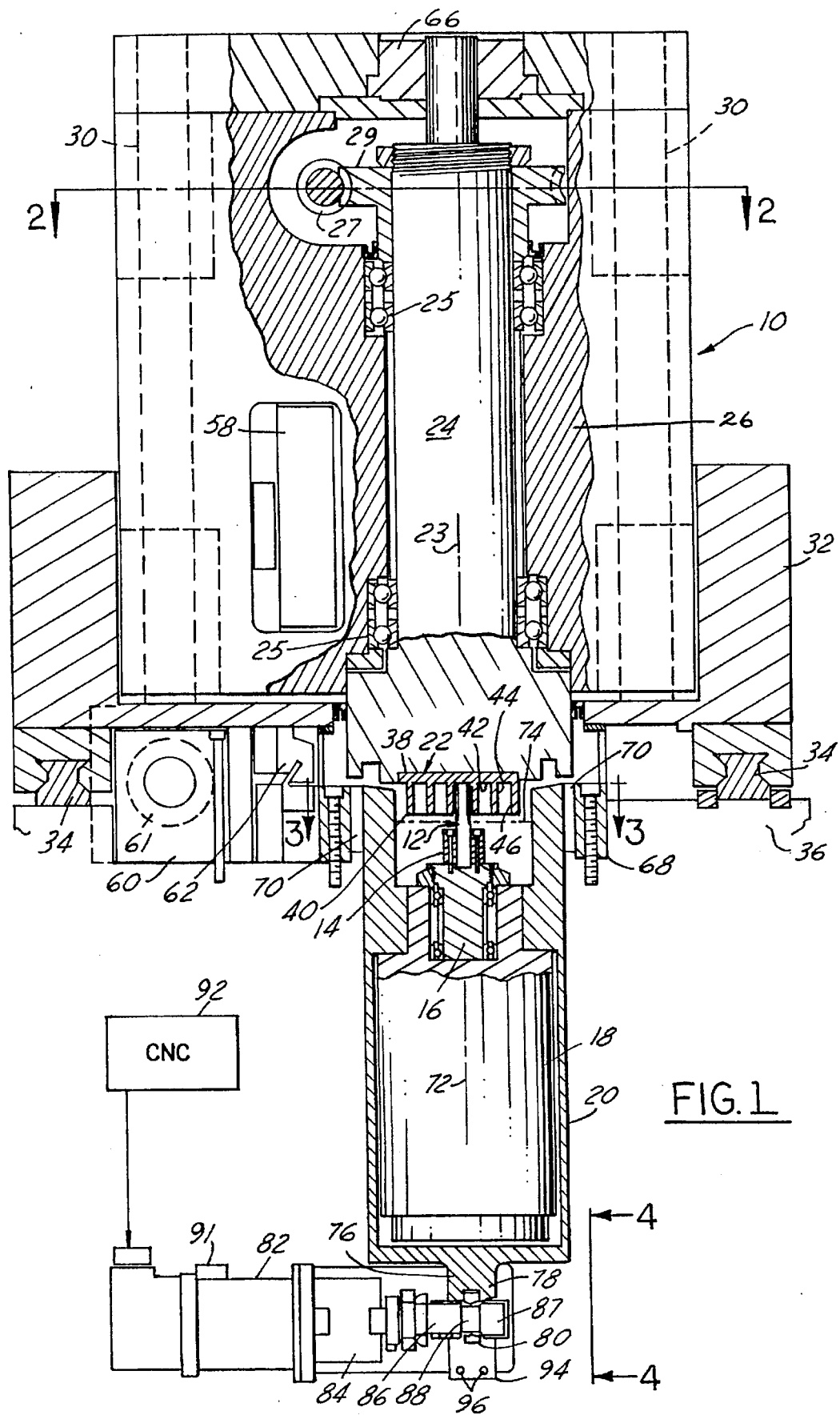
FIG. 1 is an elevational view with parts broken away and in section of a milling machine constructed in accordance with this invention.
Figure 3:
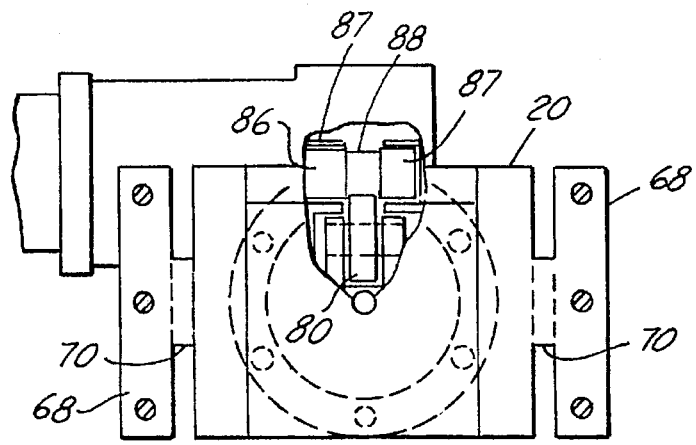
FIG. 3 is a view with parts broken away taken on the line 3—3 in FIG. 1.

Referring now more particularly to the drawings, the milling machine 10 comprises an end mill 12 gripped in a collet 14 mounted on the upper end of a generally vertical spindle 16 which is the output shaft of a rotary motor 18. The motor 18 is rigidly mounted in a cage 20.

A workpiece 22 is mounted above the end mill on the lower end of a vertical shaft 24 which is journalled for rotation about its central axis 23 by bearings 25 in a depth slide 26. The depth slide 26 is mounted for vertical sliding movement on ways 30 of a cross slide 32. The cross slide 32 is mounted for horizontal sliding movement on ways 34 of base 36.

The workpiece 22 in this instance is a cast metal scroll part of a scroll gas compressor, either the fixed scroll or the orbiting scroll. The workpiece has a flat base 38. A spiral wall 40 projects vertically away from the surface 42 of the base. The opposite, radially inner and outer surfaces 44 and 46 of the wall 40 intersect the flat surface 42 of the base and are perpendicular thereto. FIGS. 5 and 6 show the workpiece or scroll part 22 with its spiral wall 40 engaged with the spiral wall 45 of a cooperating scroll part 49 in a scroll gas compressor. One such scroll part may be fixed while the other orbits. The space 47 in FIG. 6 is the result of an incorrectly milled scroll part which causes gas leakage.

The end mill 12 has a cylindrical side wall 48 concentric with its axis of rotation 50 and an end wall 52 perpendicular to the side wall. Cutting flutes 54 are formed on both the side wall and the end wall of the mill.

Figure 7:
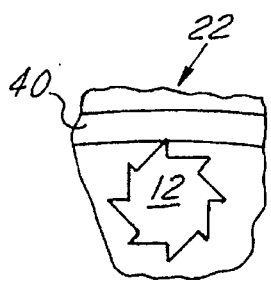
FIGS. 7 and 8 are fragmentary semi-diagrammatic views of an end mill cutting the wall of a scroll part at different points along the curve of the wall.
Figure 8:
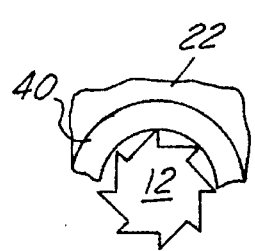
Figure 4:
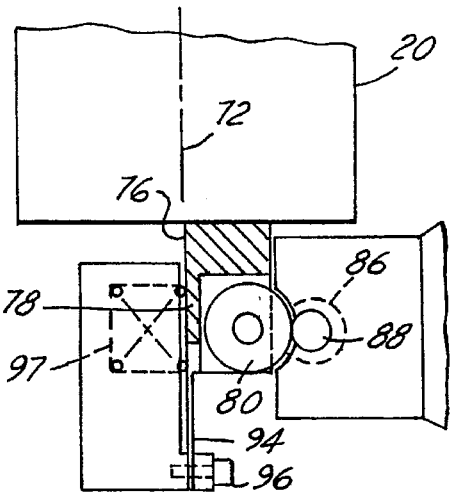
FIG. 4 is a view taken on the line 4—4 in FIG. 1.

FIG. 7 shows diagrammatically the end mill cutting the wall 40 of scroll part 22 at the outer extremity of the wall where the wall approaches flatness and only one flute cuts at any one time. FIG. 8 is a similar view but shows the end mill cutting near the middle of the wall where the wall has a smaller curvature or wrap and several flutes cut at the same time. The amount of end mill deflection will vary in part depending on the number of flutes engaging the wall at any one time. Under pressure of the end mill, the wall also deflects. The wall is more rigid where the curvature is smaller than at the outer extremity of the wall. Wall deflection varies accordingly. When the cutter leaves contact with the wall, the wall springs back also affecting the wall perpendicularity.

The depth slide 26 is moved along ways 30 by a servomotor 56. A belt drive 55 from motor 56 to ball screw 57 raises and lowers the depth slide. The position of the depth slide is monitored by an encoder 58. The cross slide 32 is driven along ways 34 by a servomotor 60 and ball screw drive 61. The position of the cross slide is monitored by an encoder 62. The shaft 24 is axially rotated by a servomotor 64, worm 63 and worm gear 65 and its rotative position is monitored by an encoder 66.

The cage 20 is connected to a stationary base 68 by flexure trunnions 70. The flexure trunnions are webs of material integral or of one piece with both the cage and the base, such material being preferably a resilient steel for example. The integral flexure trunnions are located on opposite sides of, and spaced equal distances from, the axis of rotation 72 of the mill 12 and its spindle 16. The axis of turning movement about the flexure trunnions is indicated at 74 and is perpendicular to the axis of rotation 72 of the mill 12 and its spindle 16, and on a level near the face of collet 14. The flexure trunnions are flexible and resilient and provide for pivotal adjustment of the cage about axis 74 but impose a substantial resistance to pivotal adjustment. Trunnion rotation at this position of the axis 74 causes a minimum effect on the depth of the end mill cut and on the side wall position, while allowing tilt of the end mill to correct for end mill deflection.

The spindle cage 20 has an extension 76 at the lower end. The extension 76 has a yoke 78 and journalled between the arms of the yoke on an axis parallel to the axis 74 of trunnions 70 is a cam roller follower 80. A tilt servomotor 82 is connected by coupling 84 to a cam shaft 86 journalled in bearings 87. The shaft 86 has a cam 88 engaging the cam roller follower 80. Rotation of the cam 88 against roller 80 causes the spindle cage 20 to tilt as needed to change the angle of the end mill and compensate for end mill deflection. The position of cam shaft 86 is monitored by encoder 91.

A computer numerical control (CNC) 92 is provided to control the operation of the servomotors 64, 56, 60 and 82, for the workpiece support shaft 24, the depth slide 26, the cross slide 32 and the cam shaft 86, respectively.

To provide the flexure trunnions 70 with additional stability of the spindle cage, the roller follower yoke 78 is provided with an additional extension in the form of a relatively wide, thin and flat blade or leaf spring 94. The lower end of leaf spring 94 is clamped to the base by fasteners 96, allowing controlled flexure of the cage in the direction of cage tilt about the axis of the flexure trunnions 70, but preventing any side motion of the cage that might be allowed by the trunnions. A spring unit 97 presses on the extension 76 to maintain follower 80 in contact with the cam 88. The leaf spring 94 is located on the centerline of the end mill and spindle and disposed parallel with the axis of the flexure trunnions and imposes additional resistance to pivotal movement of the cage.

By tilting the end mill the required amount as the scroll part is slowly turned, the surface 44 or 46 of the wall 40 and the surface 42 of the base 38 can be simultaneously cut perpendicular to one another despite end mill deflection due to side loading. FIG. 14 shows the end mill tilted according to this invention.

Figure 10:
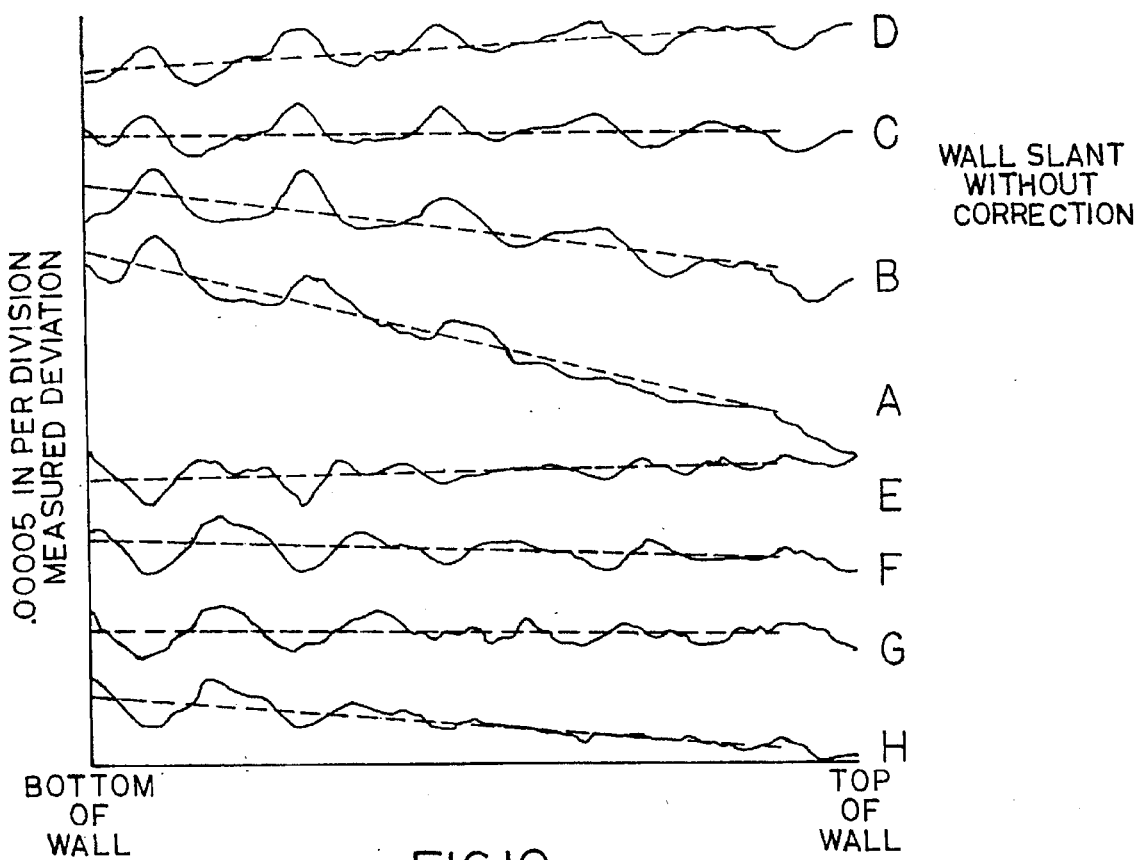
FIG. 10 is a chart of actual slant measurements made on a scroll which was milled without compensation for end mill and wall deflection.
Figure 11:
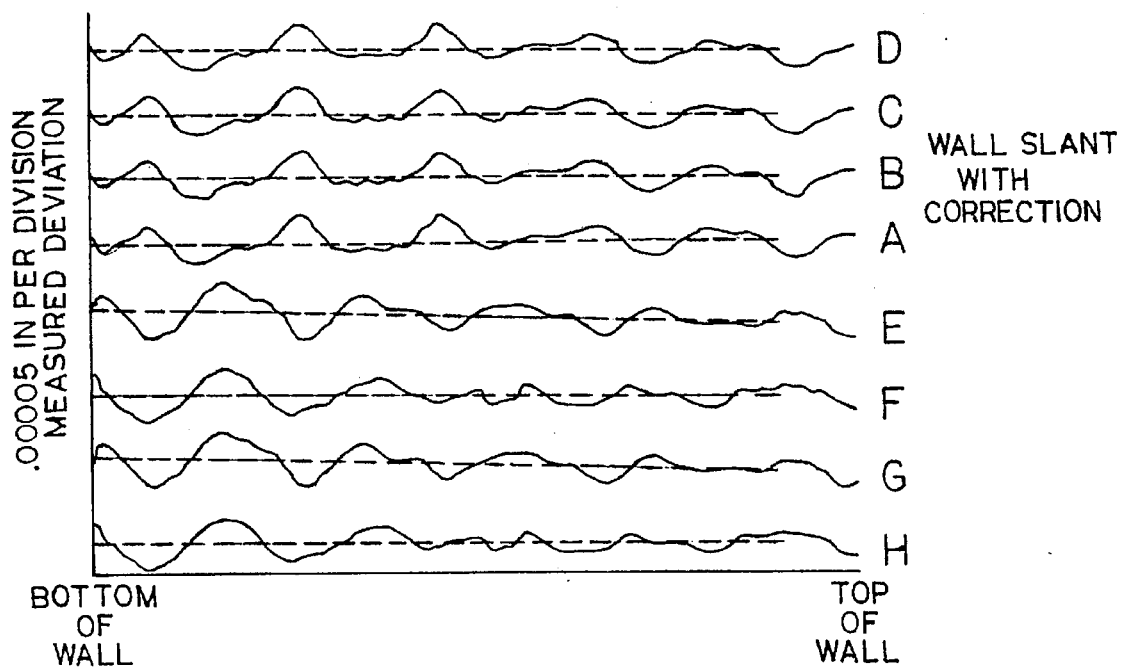
FIG. 11 is a chart of actual slant measurements made on a scroll which was milled with compensation for end mill and wall deflection according to this invention.

FIG. 10 is a chart of actual slant measurements made on a scroll which was milled without compensation for end mill and wall deflection. The wall is significantly slanted. FIG. 11 is a similar chart in which the scroll was milled with compensation, that is, with the collet and mill tilted. The waviness of the inspection is due to minute errors in the grind of the end mill.

Wall perpendicularity was milled with a six spiral flute 0.0005" reverse taper end mill cutter. The mill cutter is shown diagrammatically in FIG. 9 in various positions A–G of its mill path while machining the inner and outer scroll walls with the same cutter. These various positions A–G are also indicated in FIGS. 10 and 11.

At position A in FIG. 10, the small scroll radius of the inner scroll wraps closely around the mill cutter and two or more of the end mill flutes are engaging the scroll wall. The pressure of the mill cut causes the end mill to deflect away from the scroll wall with the tip of the end mill, which is cutting the bottom of the wall, to deflect a greater amount than the end mill shank deflects. As shown in perpendicularity inspection of the resulting wall at A, the wall is tapered.

At position B in FIG. 10, the inner scroll radius has increased; resulting in fewer of the spiral flutes engaging the wall and deflection of the end mill is reduced. The wall taper is correspondingly reduced.

At position C in FIG. 10, the scroll radius has increased farther with fewer of the spiral flutes engaging the scroll, thus reducing the end mill deflection and reducing the wall taper. In addition, at the outer reaches of the scroll, the radius of the scroll will become flatter and less rigid than the wall was at the small radius of position A. Under the pressure of the mill cutter, the top of the wall deflects away from the end mill and does not mill as deeply. When the cutter leaves the scroll, the wall springs back, resulting in a wall taper that first compensates for the taper due to the end mill deflection and (at the farther out reaches of the scroll) the wall deflection overcomes the end mill deflection and the wall taper reverses as shown in position D.

At positions E and F of FIG. 10 of the end mill milling the outer scroll wall, the number of flutes engaged are reduced even farther and becomes less of a varying factor. The affect of loss of wall rigidity from inner to outer scroll reaches remains a factor, however, Note that the wall taper of inner wall position C is comparable to outer wall position G.

This end mill was ground with a reverse taper of 0.0005" in an effort to compensate partially for end mill deflection when under the pressure of the cut. Since the wall taper varies continuously, reverse taper is only a partial answer to obtaining wall accuracy which will prevent gas leakage and loss of efficiency of the scroll compressor.

Applicant's programmable taper control can correct this loss of compressor efficiency by inspecting a sample part and programming appropriate corrections.

FIG. 11 shows the improved perpendicularity of the walls when milled with compensation, that is, with tilt of the collet and mill. As there shown, these walls at the same points as in FIG. 10, are virtually free of the slant seen in FIG. 10.

FIG. 12 shows the end mill deflection at position A of FIG. 9 when the collet and mill are not tilted.

FIG. 13 shows the wall spring back at position D after the end mill has left the area, when the collet and end mill are not tilted.

FIG. 14 shows the spindle and end mill collet tilted to compensate for the end mill deflection that occurs in position A of FIG. 9.

Figure 15:
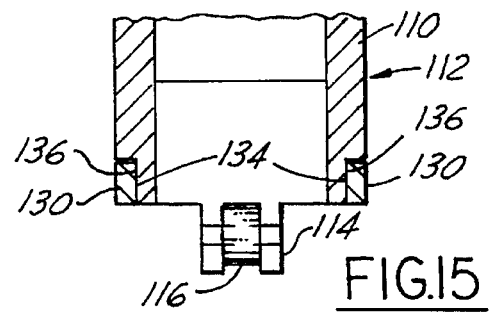
FIG. 15 is a fragmentary sectional view of a modification.
Figure 16:
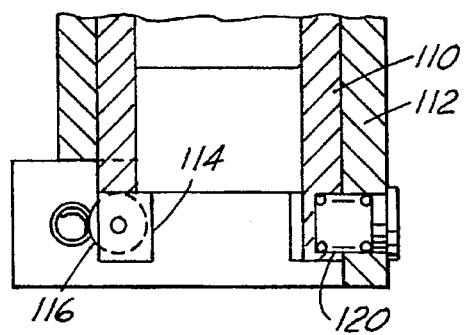
FIG. 16 is a sectional view of the modification of FIG. 15, taken at right angles thereto.
Figure 17:
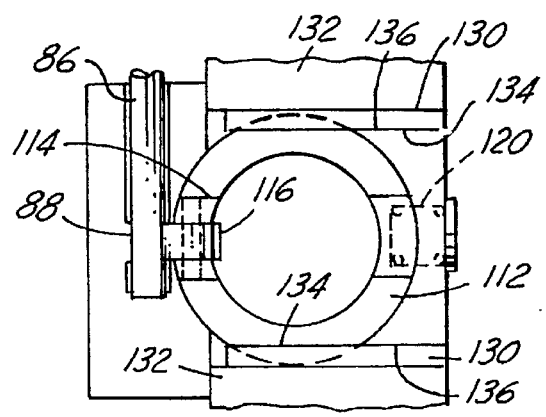
FIG. 17 is a bottom view of the modification of FIGS. 15 and 16.

Referring to the modification of FIGS. 15–17, the bottom of the cylindrical wall 110 of the spindle cage 112 has a downwardly extending yoke 114 and journalled between the arms of the yoke on an axis parallel to the axis of the trunnions is the cam roller follower 116. The cage 112, yoke 114 and follower 116 are similar to the cage 20, yoke 78 and follower 80 described in the first embodiment. The cam 88 is on shaft 86 which is rotated by the servomotor 82 and monitored by encoder 91, all as previously described, so that rotation of the cam causes the spindle cage to tilt as required to change the angle of the end mill and compensate for end mill deflection. A spring unit 120, like spring unit 97 previously described, presses against the opposite wall of the cage to maintain the follower in contact with the cam.

In this second embodiment, additional stability for the trunnions 70 is provided by guide plates 130. As shown in FIGS. 15 and 17, plates 130 are flat, elongated members mounted in laterally spaced apart, parallel relation on the base 132 and have flat, parallel, planar inner surfaces 134 which are perpendicular to the axis of the trunnions 70. At the bottom of the cage on opposite sides thereof 90° from the cam follower 116, the cage has outwardly facing, parallel, flat, planar surfaces 136 which are in full surface-to-surface sliding contact with the inner surfaces 134 of plates 130. The plates 130 guide the tilting of the cage about the axis of the flexure trunnions 70, but prevent any side motion of the cage that might be allowed by the trunnions.

Other than as thus shown and described, the rest of the structure of the modification of FIGS. 15–17 is like that in FIGS. 1–14.

The operation of the machine is as follows:

(1) A sample part is machined and inspected at intervals along the scroll wall. At these various intervals, the deflection of the scroll wall is noted.

(2) The inspection results are loaded into the tool offset tables of the CNC control 92 at the matching intervals of the CNC program.

(3) Additional parts are machined with the above tool offsets, causing the tilt servomotor 82 to continuously correct for the varying wall slant found in the sample cut part. The positions of the workpiece support shaft 24, the depth slide 26, the cross slide 32 and the cam shaft 86 monitored by the encoders 66, 58, 62 and 91, respectively, are fed back to the CNC control 92.

Precision straight walls and flat end mill cuts perpendicular to one another can thereby be achieved, preventing (in the case of scroll compressors) gas leakage and loss of compressor efficiency.

The apparatus of this invention is not limited to scroll machining, but rather has application to any precision end mill operation.

We claim:

1. A milling machine for milling a surface of a workpiece comprising:

an end mill having an axis of rotation, said end mill having a cylindrical side wall which is concentric with said axis of rotation and which is provided with circumferentially spaced side cutting flutes, first mounting means for the workpiece, second mounting means including a cage adjustably mounting said end mill for rotation about its axis of rotation with the side flutes thereof in pressure contact with said surface of the workpiece, means for adjusting the position of said cage to compensate for side deflection of said end mill resulting from the said pressure contact of said side flutes with said surface of the workpiece, and means for controlling the operation of said adjusting means based on data obtained by inspection of a previously milled sample workpiece.

2. A milling machine for simultaneously milling first and second intersecting substantially perpendicular surfaces of a workpiece comprising:

an end mill having an axis of rotation, said end mill having a cylindrical side wall which is concentric with said axis of rotation and which is provided with circumferentially spaced side cutting flutes, said end mill having an outer end wall which is substantially perpendicular to said axis of rotation and which is provided with end cutting flutes, first mounting means for the workpiece, second mounting means including a cage adjustably mounting said end mill for rotation about its axis of rotation with the side flutes thereof in pressure contact with said first surface of the workpiece and the end flutes thereof in pressure contact with the second surface of the workpiece when the workpiece is mounted on said first mounting means, means for adjusting the position of the said cage to compensate for side deflection of said end mill resulting from the said pressure contact of said side flutes with the first surface, and means including a computer numerical control for controlling the operation of said adjusting means based on data obtained by inspection of a previously milled sample workpiece.

3. A milling machine as defined in claims 1 or 2, wherein said adjusting means comprises a cam follower on said cage, a cam engaging said cam follower, and means for moving said cam to move said cam follower and thereby adjust the position on said cage.

4. A milling machine as defined in claim 3, wherein said means for moving said cam includes a computer numerical control.

5. A milling machine as defined in claims 1 or 2, wherein said second mounting means comprises a base, and pivot means connecting said cage to said base for pivotal movement by said adjusting means.

6. A milling machine as defined in claim 5, and further including stabilizing means for said cage, permitting movement thereof about said axis of pivotal movement but preventing motion transversely thereof.

7. A milling machine as defined in claim 6, wherein said stabilizing means comprises a leaf spring connected to said cage.

8. A milling machine as defined in claim 6, wherein said stabilizing means comprises guide plates slidably engaging said cage.

9. A milling machine as defined in claim 5, wherein said pivot means comprises flexure trunnions formed integrally with said cage and said base and made of flexible, resilient material.

10. A milling machine as defined in claim 5, wherein said second mounting means comprises a collet gripping said end mill, the axis of said pivotal movement extends on a line through said end mill and perpendicular thereto and on a level near the face of the collet.

11. A milling machine as defined in claim 10, wherein said pivot means comprises flexure trunnions formed integrally with said cage and said base and made of flexible, resilient material.

12. A milling machine as defined in claim 11, wherein said adjusting means comprises a cam follower on said cage, a cam engaging said cam follower, and means for moving said cam to move said cam follower and thereby adjust the position on said cage.

13. A milling machine as defined in claim 12, and further including stabilizing means for said cage, permitting movement thereof about said axis of pivotal movement but preventing motion transversely thereof.

14. A milling machine as defined in claim 13, wherein said stabilizing means comprises a leaf spring connected to said cage.

15. A milling machine as defined in claim 14, wherein said cage has first and second ends, said end mill is disposed adjacent said first end of said cage, and said leaf spring is disposed at the second end of said cage.

16. A milling machine as defined in claim 15, wherein said leaf spring is disposed on the centerline of said end mill and parallel to the axis of said pivot means.

17. A milling machine as defined in claim 16, wherein said means for moving said cam includes a computer numerical control.

18. A milling machine as defined in claim 13, wherein said stabilizing means comprises guide Plates slidably engaging said cage, said cage has first and second ends, said end mill is disposed adjacent said first end of said cage, and said guide Plates engage said second end of said cage.

* * * * *